Nov. 26, 1946.      R. S. THOMPSON      2,411,562
SEGMENT TYPE RESILIENT ENGINE MOUNT
Filed Feb. 23, 1944          4 Sheets-Sheet 1

Inventor
Ransom S. Thompson
By Charles Shelton
Attorney

Nov. 26, 1946.   R. S. THOMPSON   2,411,562
SEGMENT TYPE RESILIENT ENGINE MOUNT
Filed Feb. 23, 1944   4 Sheets-Sheet 3

Inventor
Ransom S. Thompson
By Charles L. Shelton
Attorney

Nov. 26, 1946.    R. S. THOMPSON    2,411,562
SEGMENT TYPE RESILIENT ENGINE MOUNT
Filed Feb. 23, 1944    4 Sheets-Sheet 4

Inventor
Ransom S. Thompson
by Charles L. Shelton
Attorney

Patented Nov. 26, 1946

2,411,562

UNITED STATES PATENT OFFICE 2,411,562

SEGMENT TYPE RESILIENT ENGINE MOUNT

Ransom S. Thompson, East Hartford, Conn., assignor to United Aircraft Corporation, East Hartford, Conn., a corporation of Delaware Application February 23, 1944, Serial No. 523,543

14 Claims. (Cl. 248—5)

This invention relates to resilient mounting means for a vibratory body and particularly to a vibration damping and isolating head or support primarily adapted for mounting an aircraft engine of the radial type on the forward portion of an aircraft fuselage.

A primary object of the invention is to provide an improved vibration isolating and absorbing mount or support for a vibratory body to suppress or dampen vibrations of the body, and its associated parts, and isolate them from a supporting structure to which the body is attached.

Another object of the invention is to provide an improved form of resilient mounting head, a plurality of which are provided angularly spaced and attached by suitable brackets extending from an engine or other vibratory body to a bulkhead or mounting ring at or adjacent the forward end of an aircraft fuselage or other supporting structure, each mount preferably being attached to the body by a group of struts extending angularly from a portion of the mount and attached at their opposite ends to different widely spaced parts of the body.

Another object of the invention is to provide a resilient mount primarily designed for aircraft engines in each of which are housed opposed segmental pads of compressive resilient material such as semi-vulcanized rubber, each mount comprising two opposed halves and each half having one of the resilient pads therein, the two parts of the mount being clamped together so that they hold the resilient pads in compression against the surface of a mounting ring or series of brackets.

Another object of the invention is to provide opposed friction members within the mounts, each friction member being adapted to press firmly against the fuselage mounting member, these members being in the form of curved plates positioned opposite each other and forced toward the fuselage mounting member by springs surrounding a part of the mount and engaging members radially slidable within the mount, the inner ends of which bear against and force the friction members or curved plates against the fuselage mounting member.

Another feature of importance is that the resilient pads housed within the mounts are of segmental form and are mounted diametrically opposite each other in the heads or mountings the proportions and angular disposition of the pads being proportioned so that the stiffness rates of the heads in the different directions of the three principal axes of the heads may be different and proportioned individually as required to resist the forces in the direction of the three axes.

And finally it is an object of the present invention to form the opposed halves or parts of the individual mounts so that an engine may be conveniently assembled on a fuselage with one of the halves of each mount already connected to its struts and with the opposite ends of these struts secured to the engines, the opposite halves of the mounts being connected to the halves on which the struts are mounted to attach the mounts to the fuselage mounting member.

Other objects and advantages will be apparent from the specification and claims and from the drawings which illustrate what is now considered to be a preferred embodiment of the invention.

Figure 1:
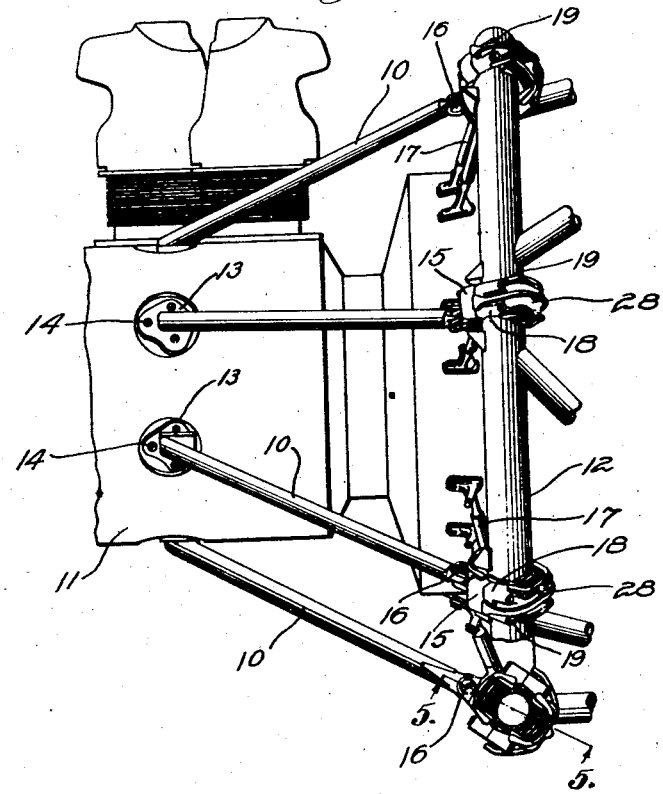
Fig. 1 is a side elevation of a complete resilient mounting assembly for an engine of the radial type shown connected to a mounting ring at the forward end of an aircraft fuselage.

In its preferred form and as shown in the drawings, the invention may include the following principal parts: First, a plurality of similar two-part mounts attached in angularly spaced relation to each other to a ring, or series of brackets, provided on the forward end of an aircraft fuselage; second, struts extending from each of said mounts and attached at their opposite ends to different portions of the engine casing; third, resilient pads housed within the mounts in opposed relation to each other and bearing against the surface of the ring or brackets; fourth, clamping means for drawing together and retaining the two parts of a mount in cooperative relation to each other and with the resilient pads compressed against the mounting member; and fifth, friction members within the mounts forced resiliently against and movable over the surface of the mounting member.

An aircraft engine and its associated parts, during operation constitutes a vibratory body which sets up force impulses in various directions which in turn are transmitted to the support for the engine, that is, to the fuselage of the aircraft. If the natural frequency of vibration of the engine is synchronous with the frequency of the force impulses, the vibrations become greatly increased and may reach amplitudes great enough to be objectionable and injurious to the engine or aircraft.

The principal force impulses set up by the vibrations of an engine and its associated parts comprise forces acting along the axis of the engine and also comprise force couples acting in various directions. The principal vibratory motions to be considered are: first, oscillations of the engine about its longitudinal central axis, which may be called the torsional vibration; second, angular oscillations of the engine about an axis normal to the central longitudinal axis and passing through the center of gravity of the vibratory mass; and third, linear movements on an axis normal to the crankshaft axis.

To suppress or diminish vibrations of these types, elastic mounting devices having the necessary stiffness or resiliency in the various directions of the vibratory force are disposed equidistantly about the mounting member for the engine. These devices are generally disposed in a plane normal to the engine axis and at a distance laterally from the center of gravity of the engine. The torsional vibrations as defined above are taken and absorbed by the resilient pads directly in shear.

The vibrations of the second type, such as pitching vibrations, are absorbed in the rubber in the pads partly in shear stresses and partly in compressive stresses, while the vibrations of the third type, which may be called radial vibrations, are taken up and suppressed by the resilient pads acting largely in compression, the dimensions of the pads being so proportioned that the vibrations of the principal types are substantially equally suppressed.

The plane of the mounting ring or bulkhead in standard forms of aircraft engine installations is offset laterally a considerable distance from the center of gravity of the engine and its attached parts. This distance between the center of gravity of the engine and the plane of the supports or mounts introduces force couples which must be suppressed to absorb the vibrations of the second and third types as defined above. Individual elastic mountings for the engine for absorbing all vibrations preferably are in the form of semi-vulcanized rubber cushions of segmental form and suppress vibrations in the different directions as stated above, the torsional vibrations as stated above being taken in shear and the remaining vibrations in either combined shear and compression or largely in compression.

The primary object of the invention, therefore, is to provide a convenient and compact resilient mount or support for an aircraft engine, a number of these mounts being secured to the mounting ring or other mounting member or members on the aircraft fuselage angularly spaced apart, and each mounting is so designed that substantially all the vibrations of the three different principal types may be substantially suppressed and isolated from the plane.

In the embodiment of the invention illustrated in the drawings, an engine is shown having struts attached thereto by means of which the engine is attached to the aircraft fuselage by being supported from a mounting ring, or series of brackets, extending from or forming a part of the fuselage of a plane. The struts at one end are attached to the engine and at their opposite ends are attached in groups to the mounting ring or brackets by means presently to be described.

Figure 2:
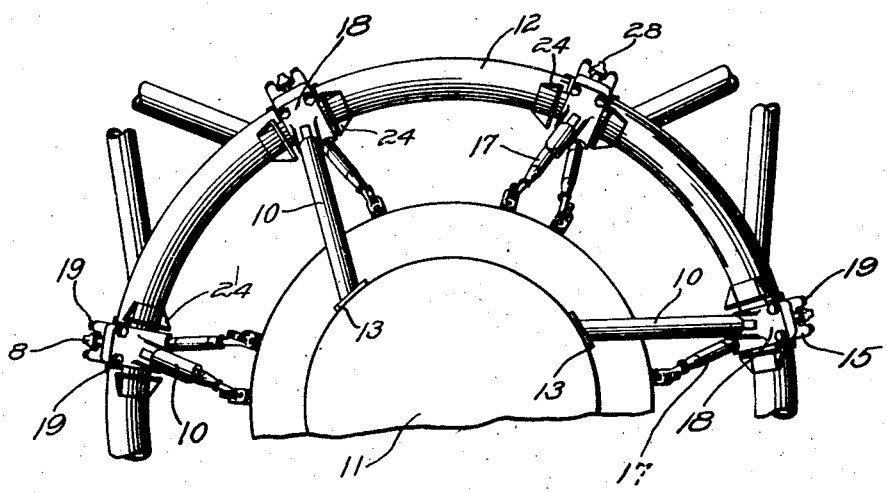
Fig. 2 is a front elevation of the form of mounting assembly shown in Fig. 1.
Figure 3:
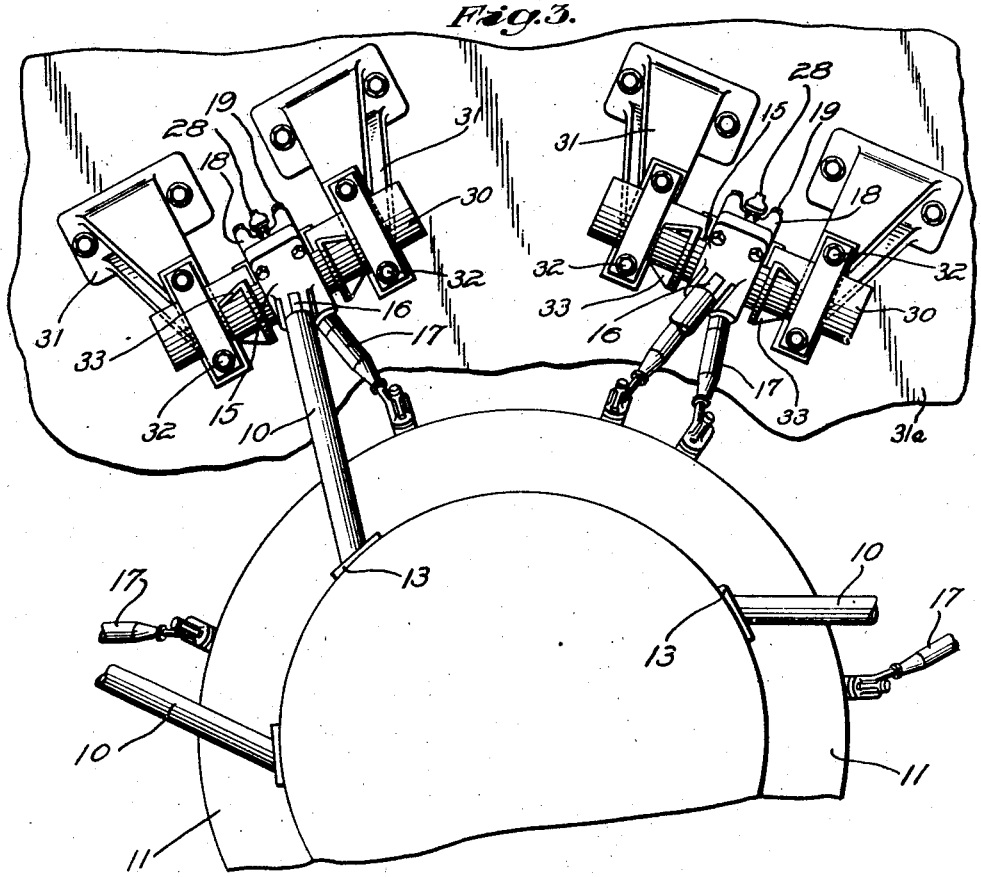
Fig. 3 is a front elevation showing mounts made in accordance with the present invention applied to a plurality of brackets provided on a fuselage bulkhead.

Referring more in detail to the figures of the drawings and first to Figs. 1, 2 and 3, it will be seen that the supporting assembly for mounting the engine on an aircraft fuselage (not shown) includes a plurality of struts. These struts are of two series, one series as indicated at 10 being elongated and attached at one end to a portion of the engine 11 by means of suitable pads 13 attached permanently, as by welding, to the struts 10 and detachably attached to the engine casing 11, as by means of suitable bolts or screws 14. These struts at their opposite ends are attached individually to the heads 15 there preferably being but one of these struts 10 connected to each head 15. Each strut 10 is preferably provided with a hinged joint 16 closely adjacent the head 15 extending transversely of the strut and substantially parallel with the fuselage support. A second series of struts 17 shorter than struts 10 are attached at one end to the engine casing 11 at portions spaced a material distance from the ends of struts 10. As shown in Figs. 1, 2 and 3, two of these struts 17 are attached to each head 15 and preferably are made adjustable as to their length by suitably threaded members indicated in Figs. 1, 2 and 3.

As will be seen in the drawings, the struts 10 extending from the mounts or heads 15 are attached to an intermediate portion of the engine and the second or shorter series 17, two from each mounting, are attached to the engine at points spaced a substantial distance axially from the first series and closer to the mounting ring or members. Both series of struts 10 and 17 have their opposite ends attached to the same half-member of the mounts or heads 15.

The heads 15 are formed of two opposed members each having a part of a cylindrical or other surface adapted to fit about the supporting members or mounting ring 12 on the fuselage of the airplane.

Figure 6:
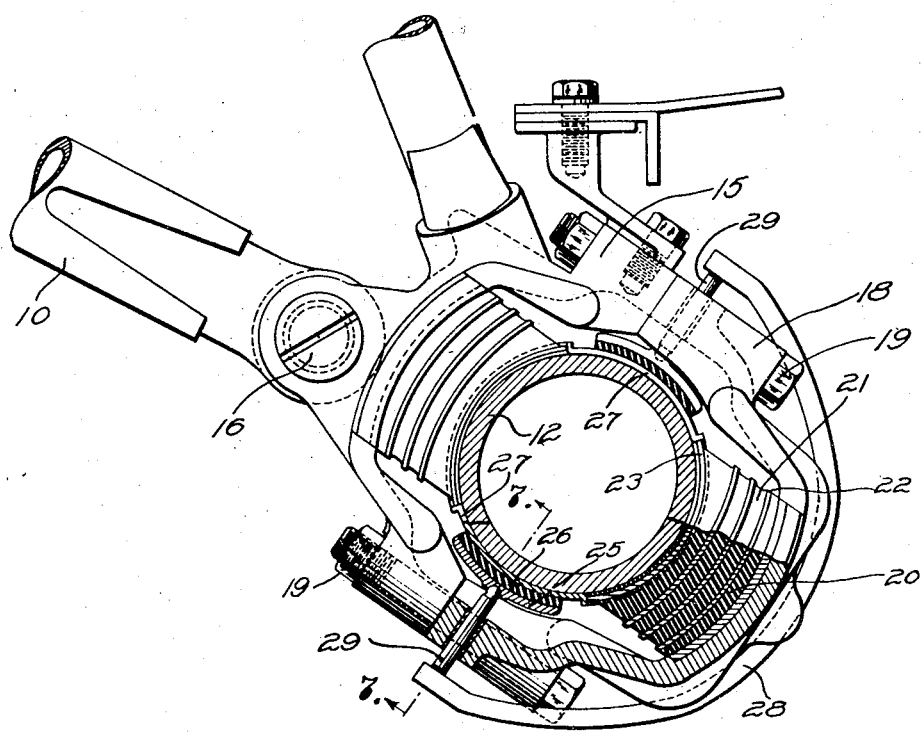
Fig. 6 is a detail view, partly in section, of one of the resilient mounts forming part of the assembly shown in Figs. 1 and 2, upon an enlarged scale.
Figure 7:
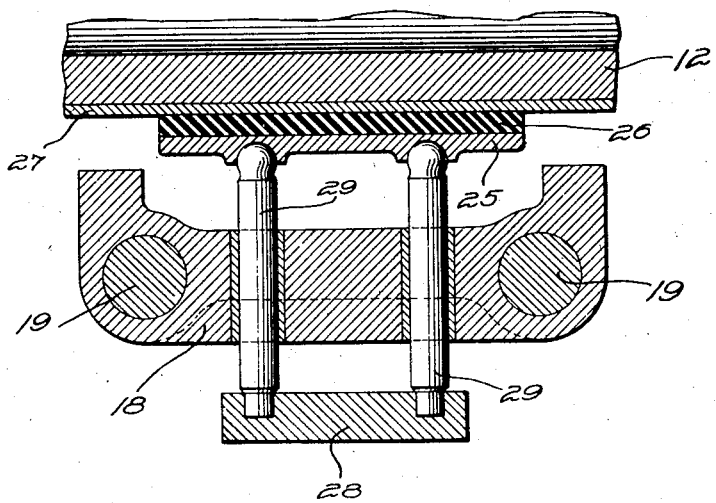
Fig. 7 is a sectional view of a part of the mount taken on the plane of line 7—7 in Fig. 6 on an enlarged scale.

It will be noted from an inspection of the drawings particularly Fig. 6 that the part of the heads or mountings 15 attached to the above referred to struts 10 and 17 does not extend to a diametrical plane of the fuselage support member but that the two parts of the head are unequal. The companion or cap member 18 of each head 15 is extended beyond this diametrical plane. This division of the parts of the heads is provided for a purpose presently to be described.

To retain the companion or cap member 18 of the heads in operative position bolts 19 may be provided, four being used for each head rigidly holding the two halves of the heads closely together. The half of each head 15 to which the struts 10 and 17 are attached includes less than a half circumference of the mounting ring or portion of the bracket member to which the heads are attached. The opposite or cap halves 18 of the heads 15 are placed on their heads 15 and the complemental halves are drawn together after the engine 11 has been moved into position relative to the aircraft fuselage. This can be done for the reason that the strut mounting halves of the heads have their inner portions reduced to permit the mounting ring to enter all of them in their mounted positions. With these halves bolted or clamped together the engine and fuselage are fully coupled together in operative relation.

Fig. 3 shows an alternate form for mounting an engine and employing the form of resilient mount shown in connection with Figs. 1 and 2. In Fig. 3 the heads are attached to the engine casing 11 in the same manner, as shown in Figs. 1 and 2, that is by struts 10 and 17.

Figure 4:
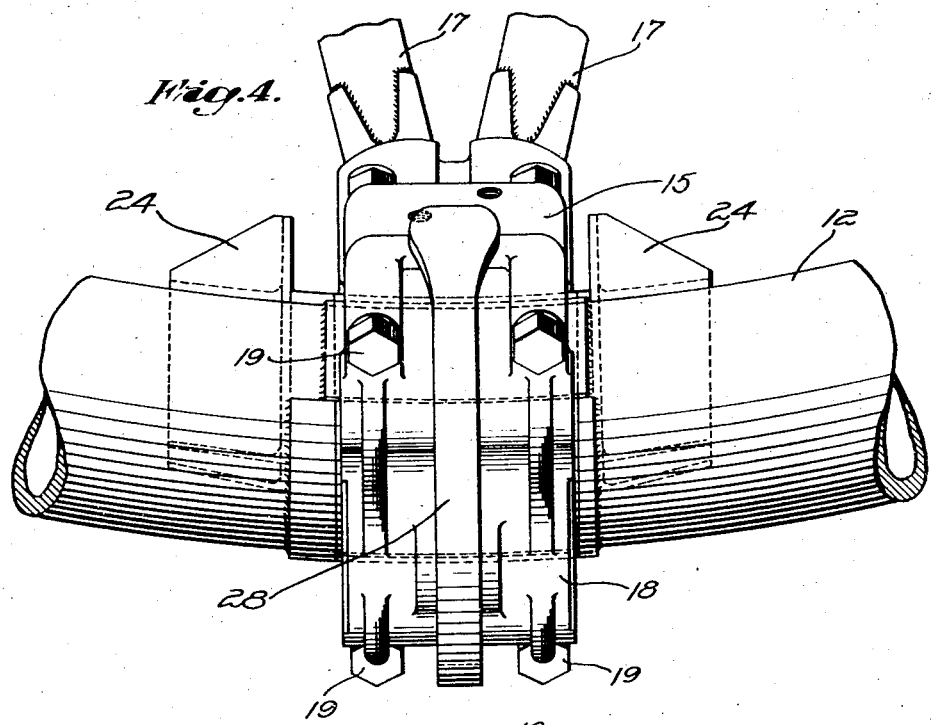
Fig. 4 is an enlarged front elevation of one of the resilient mounts.
Figure 5:
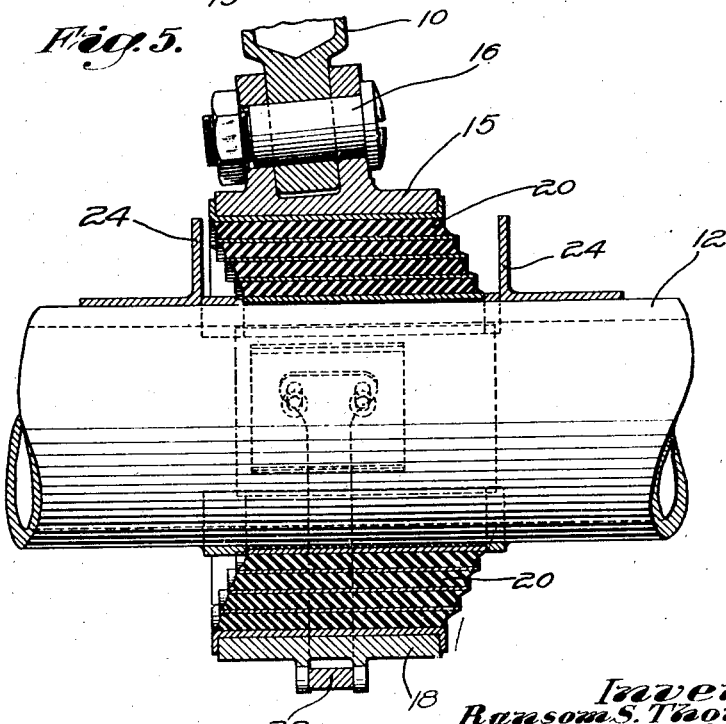
Fig. 5 is a central sectional view on an enlarged scale taken on the plane of lines 5—5 in Fig. 1.

The resilient pads are, as shown in the drawings, in the form of segments 20 and are disposed diametrically opposite each other within each head, with their compressive axes aligned, and converging toward a point within the engine, so that when the parts of the head 15 are drawn together the pads 20 are compressed and forced against opposite portions of the mounting ring or bracket. As shown these pads 20 are made up of a plurality of arcuate layers of resilient material 21 such as semi-vulcanized rubber bonded by any suitable means to interposed metal strips 22. The inside portion of each of the pads preferably has a metal strip 23 bonded thereto which contacts the surface of the mounting member 12 or with a bearing strip secured thereon. By choosing the proper proportion for the length, width and radial thickness of the pads, the desired stiffness or resiliency in the different directions of the principal vibratory forces can be obtained. Fig. 5 shows the position of the layers of resilient material in the position assumed when the engine is at rest and while there is no torque applied to the mount. The position shown in Fig. 4 is that assumed when normal or running torque is applied to the mount during operation of the engine. In this latter position the successive layers of resilient material are directly superposed upon each other. On either side of the mounts and secured to the mounting ring or members are outstanding flanges 24 which serve as limit stops. These flange members 24 are secured directly to the mounting ring or members as by welding and the flanges are so spaced that the heads can move from their positions of rest to their normal or running position.

The friction members by means of which vibrations of the structure are suppressed and isolated from the aircraft may be in the form of curved plates 25 engaging portions of the mounting ring or the cylindrical members supported from a bulkhead. These plates 25 may have a frictional lining of bearing material 26 on their faces engaging the supporting member and the portion of the supporting member 12 engaged by the friction member 25 may be reinforced by a wearing strip 27 preferably welded or brazed directly to the supporting ring or member and serving to space the resilient pads 20 on the cross-sectional periphery of the ring 12. To force these friction members 25 against the mounting member or members 12, springs 28 are provided. The springs 28 shown in the drawings are preferably of semi-circular form and extend partially about the outer portions 18 of the head in which the friction members are mounted. Pins 29 extending substantially radially through portions of the head engage within recesses within the ends of the spring 28 and at their inner ends contact the outer surface of the friction members 25. As shown in the figures of the drawings, the springs 28 closely surround the outer portion of the head.

In the modification of the invention shown in Fig. 3 of the drawings the heads formed by the members 15 and 18 are similar to those previously described except that they fit over separated cylindrical members 30 instead of over portions of the mounting ring 12. The members 30 may be mounted as shown on brackets 31 in pairs bolted or otherwise secured to a bulkhead or other part of an aircraft fuselage, a portion of which is shown at 31a. As indicated in Fig. 3 the brackets 31 are disposed so that each pair supports a single head between them. Each member 30 may be secured rigidly to its two supporting brackets by bolts 32 and may have flange members 33 similar to members 24 to limit movements of the heads from a no-torque position to that of maximum torque.

It is to be understood that the invention is not limited to the specific embodiment herein illustrated and described, but may be used in other ways without departure from the spirit of the invention as defined by the following claims.

I claim:

1. Resilient means for mounting a vibratory body on a supporting structure, said mounting means comprising a plurality of heads each enclosing a portion of the supporting structure and having opposed segmental resilient pads compressed within them and bearing against said supporting structure, and means for connecting said heads rigidly to said body including a plurality of struts connecting said heads rigidly to axially and circularly spaced portions of said body.

2. Resilient means for mounting an aircraft engine on a fuselage mounting member, said mounting means comprising a plurality of angularly spaced two-part heads, one part of each of which is connected to the engine, the parts of each head being secured together and having opposed segmental resilient pads therein compressed against said mounting member, and means for connecting said heads rigidly to said engine including a plurality of struts connecting the engine connected part of each of said heads to the engine at axially spaced points on said engine.

3. Resilient means for mounting an aircraft engine on a fuselage mounting member, said mounting means comprising a plurality of angularly spaced two-part heads each enclosing a portion of the mounting member and having opposed segmental resilient pads disposed within each of the two opposed parts and compressed against said mounting member when said opposed parts are drawn together into operative position, and means for connecting said heads rigidly to said engine including a plurality of struts connecting each of said heads to axially and circularly spaced portions of said engine.

4. Resilient means for mounting an aircraft engine on a fuselage mounting ring, said mounting means comprising a plurality of two-part heads, one part of each of which is conneected to the engine, each head enclosing a portion of the mounting ring and having opposed segmental resilient pads compressed within opposed parts thereof and bearing against said mounting ring, and means for connecting said heads rigidly to said engine including three angularly disposed struts connecting the engine connected parts of each of said heads to axially and circularly spaced portions of said engine.

5. Resilient means for mounting an aircraft engine on a fuselage mounting ring, said mounting means comprising in combination, a plurality of two-part heads disposed at spaced points about the periphery of said ring and each enclosing a portion of the periphery thereof, the parts of said heads being rigidly secured together, opposed segmental resilient pads housed within said parts and compressed against said mounting ring, the length of each pad as measured on the tangent to the outer periphery of the cross-section of said ring being less than the diameter of said cross-section, and elongated struts each attached at one end to one part of said heads and at their opposite ends to axially spaced portions of said engine.

6. Resilient means for mounting an aircraft engine on a fuselage mounting member, said mounting means comprising in combination, a plurality of two-part heads, the parts of which are rigidly secured together, opposed segmental resilient pads housed within said parts and compressed against the surface of said mounting member, and members within said heads resiliently forced against said mounting member and frictionally movable thereon.

7. Resilient means for mounting an aircraft engine on a fuselage mounting member, said mounting means comprising in combination, a plurality of two-part heads rigidly secured together and having opposed segmental resilient pads housed within said heads, said pads being compressed against the surface of said mounting member and spaced circumferentially of said engine, and opposed friction members mounted within said heads and between said resilient pads, and springs forcing said members against said mounting member.

8. A resilient mount for a vibratory body comprising a two-part head adapted to surround a portion of a supporting structure, opposed compressive and resilient pads housed within said head, means forcing said pads against said structure when said head parts are held together in operative position, friction damper members mounted within said head between said compressive pads, and spring means forcing said damper members against said supporting structure.

9. A resilient engine mount for aircraft comprising a two-part head adapted to surround an engine mounting member, opposed compressive and resilient pads within said head, means forcing said pads against said member, damper members movably mounted within said head between said compressive pads, and spring means mounted in said head forcing said damper members frictionally against oppositely disposed portions of said mounting member.

10. A resilient engine mount for aircraft comprising a two-part head adapted to surround a portion of an engine mounting member, opposed compressive and resilient pads within said head, means forcing said pads against said member, opposed damper members movably mounted within said head and disposed between said compressive pads, a spring member partially surrounding each of said heads and connected to and forcing said damper members frictionally against said monuting member, and struts extending from said head and adapted to be attached at their opposite ends to said engine.

11. In a mounting for an aircraft engine, a fuselage mounting ring, a plurality of two-part heads spaced circumferentially of said ring and each surrounding a circumferential portion of said ring, struts connecting said heads to spaced portions of the engine, means for clamping the parts of each head together, a segmental unit including a pad of resilient material within each of said parts and compressed against opposed surfaces of the enclosed portions of said ring by said clamping means, and opposed segmental spacers between said units fixed to the portions of said ring surrounded by said heads, said spacers having abutments engaging said units and positioning the latter against displacement.

12. In a mounting for an aircraft engine, a fuselage mounting ring, a plurality of two-part heads spaced circumferentially of said ring and each surrounding a circumferential portion of said ring, struts connecting one part of each of said heads to spaced portions of the engine, means for clamping the parts of each head together, alternately arranged pads and spacers within each head, said pads comprising segments of resilient material compressed against opposed surfaces of the enclosed portions of said ring by said clamping means, said spacers comprising wearing strips fixed to said ring between said pads, and friction members within said heads bearing against said strips.

13. In a mounting for an aircraft engine, a fuselage mounting ring, a plurality of complemental two-part heads spaced circumferentially of said ring and each surrounding a circumferential portion of said ring, a plurality of struts rigidly connecting similar parts of each of said heads to the engine at points on the engine lying in a plane axially spaced from the plane of said ring, said struts and the parts of the head carried thereby extending inwardly from said ring in generally frustro-conical formation toward the plane of attachment to the engine with the planes on which said heads are divided obliquely disposed relative to the axis of rotation of the engine, a segmental pad of resilient material carried by each head part in position to bear against the enclosed portions of said ring with the pads having their major compressive axes oblique to the axis of rotation of the engine, the complemental parts of each head being divided unequally with respect to the cross-sectional periphery of said ring enclosed thereby, each engine connected part comprising less than half of the complemental structure surrounding the ring portions, whereby the engine with its connected head parts and the pads carried thereby can be moved axially with respect to said ring into mounted position on the latter, and means for clamping said complemental parts together to compress said pads against opposite surfaces of said ring.

14. In a flexible mount for an aircraft engine, a plurality of head members rigidly attached to said engine for vibratory movement therewith, an engine supporting structure extending through said head members and spaced therefrom to form an annular channel between each of said heads and said structure, and a pair of arcuate segments of resilient material in each of said channels, said segments having their inner surfaces fixed relative to said structure and having their outer surfaces fixed relative to said heads, respectively, said pairs of segments having converging compressive axes, the segments of each pair having gaps therebetween located on lines normal to said compressive axes, respectively.

RANSOM S. THOMPSON.